(12) United States Patent
D'Silva et al.

(10) Patent No.: US 8,873,730 B2
(45) Date of Patent: Oct. 28, 2014

(54) METHOD AND APPARATUS FOR CALENDARED COMMUNICATIONS FLOW CONTROL

(75) Inventors: Alin D'Silva, Waltham, MA (US);
Mahesh Rajagopalan, Irving, TX (US);
Anirudha Joshi, Clearwater, FL (US);
Reza Ghaffari, Chestnut Hill, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2013 days.

(21) Appl. No.: 10/083,793

(22) Filed: Feb. 27, 2002

(65) Prior Publication Data

US 2004/0101121 A1 May 27, 2004

Related U.S. Application Data

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001.

(51) Int. Cl.
*H04M 3/42* (2006.01)
*H04M 3/54* (2006.01)

(52) U.S. Cl.
CPC ........ *H04M 3/54* (2013.01); *H04M 2203/2072* (2013.01)
USPC ............. 379/211.02; 379/210.01; 379/211.01

(58) Field of Classification Search
USPC ............. 379/211.02, 201.01, 210.01, 202.01, 379/88.13
See application file for complete search history.

(56) References Cited

U.S. PATENT DOCUMENTS

| | | | |
|---|---|---|---|
| 4,013,839 A | 3/1977 | Bell | |
| 4,540,850 A | 9/1985 | Herr et al. | |
| 4,600,814 A | 7/1986 | Cunniff et al. | |
| 4,734,931 A | 3/1988 | Bourg et al. | |

(Continued)

FOREIGN PATENT DOCUMENTS

| | | |
|---|---|---|
| CA | 2240878 | 12/1998 |
| DE | 10110942 | 9/2002 |

(Continued)

OTHER PUBLICATIONS

"MP3 Recorder Download—MP3 Recorder—Record Audio Stream to MP3 or WAV," 2002, http://www.mp3-recorder.net.

(Continued)

*Primary Examiner* — William Deane, Jr.

(57) ABSTRACT

Methods and apparatus for forwarding communications, such as telephone calls over a voice network, are provided. A user accesses a data network to specify one or more rules for forwarding telephone calls. For example, the user may use an electronic calendar to specify patterns for forwarding their telephone calls. These patterns may include one or more rules for determining a forwarding pattern, and one or more time periods specifying when the pattern is effective. The rules are provided to a service center which provides configuration information to the voice network. The voice network then forwards calls based on the configuration information for the time periods specified by the user.

18 Claims, 13 Drawing Sheets

(56) References Cited

U.S. PATENT DOCUMENTS

| | | |
|---|---|---|
| 4,924,496 A | 5/1990 | Figa et al. |
| 5,014,303 A | 5/1991 | Velius |
| 5,113,431 A | 5/1992 | Horn |
| 5,168,515 A | 12/1992 | Gechter et al. |
| 5,222,125 A | 6/1993 | Creswell et al. |
| 5,274,700 A | 12/1993 | Gechter et al. |
| 5,327,486 A | 7/1994 | Wolff et al. |
| 5,329,578 A | 7/1994 | Brennan et al. |
| 5,428,663 A | 6/1995 | Grimes et al. |
| 5,440,624 A | 8/1995 | Schoof |
| 5,483,586 A | 1/1996 | Sussman |
| 5,533,096 A | 7/1996 | Bales |
| 5,535,265 A | 7/1996 | Suwandhaputra |
| 5,546,449 A | 8/1996 | Hogan et al. |
| 5,548,636 A | 8/1996 | Bannister et al. |
| 5,550,907 A | 8/1996 | Carlsen |
| 5,583,564 A | 12/1996 | Rao et al. |
| 5,586,173 A | 12/1996 | Misholi et al. |
| 5,588,037 A | 12/1996 | Fuller et al. |
| 5,608,788 A | 3/1997 | Demlow et al. |
| 5,619,555 A | 4/1997 | Fenton et al. |
| 5,621,787 A | 4/1997 | McKoy et al. |
| 5,623,541 A | 4/1997 | Boyle et al. |
| 5,631,904 A | 5/1997 | Fitser et al. |
| 5,638,434 A | 6/1997 | Gottlieb et al. |
| 5,649,105 A | 7/1997 | Aldred et al. |
| 5,652,789 A | 7/1997 | Miner et al. |
| 5,661,788 A | 8/1997 | Chin |
| 5,668,863 A | 9/1997 | Bieselin et al. |
| 5,673,080 A | 9/1997 | Biggs et al. |
| 5,692,213 A | 11/1997 | Goldberg et al. |
| 5,710,591 A | 1/1998 | Bruno et al. |
| 5,712,903 A | 1/1998 | Bartholomew et al. |
| 5,715,444 A | 2/1998 | Danish et al. |
| 5,717,863 A | 2/1998 | Adamson et al. |
| 5,719,925 A | 2/1998 | Peoples |
| 5,724,412 A | 3/1998 | Srinivasan |
| 5,742,095 A | 4/1998 | Bryant et al. |
| 5,742,668 A | 4/1998 | Pepe et al. |
| 5,742,905 A | 4/1998 | Pepe et al. |
| 5,745,561 A | 4/1998 | Baker et al. |
| 5,745,884 A | 4/1998 | Carnegie et al. |
| 5,747,970 A | 5/1998 | Johnson et al. |
| 5,751,800 A | 5/1998 | Ardon |
| 5,752,191 A | 5/1998 | Fuller et al. |
| 5,764,901 A | 6/1998 | Skarbo et al. |
| 5,805,607 A | 9/1998 | Khu |
| 5,805,670 A | 9/1998 | Pons et al. |
| 5,841,837 A | 11/1998 | Fuller et al. |
| 5,864,603 A | 1/1999 | Haavisto et al. |
| 5,872,841 A * | 2/1999 | King et al. ............... 379/210.01 |
| 5,875,242 A | 2/1999 | Glaser et al. |
| 5,875,437 A | 2/1999 | Atkins |
| 5,892,900 A | 4/1999 | Ginter et al. |
| 5,903,845 A | 5/1999 | Buhrmann et al. |
| 5,907,324 A | 5/1999 | Larson et al. |
| 5,907,547 A | 5/1999 | Foladare et al. |
| 5,907,604 A | 5/1999 | Hsu |
| 5,910,987 A | 6/1999 | Ginter et al. |
| 5,916,302 A | 6/1999 | Dunn et al. |
| 5,917,817 A | 6/1999 | Dunn et al. |
| 5,917,912 A | 6/1999 | Ginter et al. |
| 5,920,826 A | 7/1999 | Metso et al. |
| 5,920,847 A | 7/1999 | Kolling et al. |
| 5,926,535 A | 7/1999 | Reynolds |
| 5,944,769 A | 8/1999 | Musk et al. |
| 5,945,989 A | 8/1999 | Freishtat et al. |
| 5,960,342 A | 9/1999 | Liem et al. |
| 5,963,925 A | 10/1999 | Kolling et al. |
| 5,982,870 A | 11/1999 | Pershan et al. |
| 6,005,870 A | 12/1999 | Leung et al. |
| 6,011,579 A | 1/2000 | Newlin |
| 6,018,571 A | 1/2000 | Langlois et al. |
| 6,018,737 A | 1/2000 | Shah et al. |
| 6,021,428 A | 2/2000 | Miloslavsky |
| 6,029,151 A | 2/2000 | Nikander |
| 6,031,896 A | 2/2000 | Gardell et al. |
| 6,041,103 A | 3/2000 | La Porta et al. |
| 6,052,372 A | 4/2000 | Gittins et al. |
| 6,058,163 A | 5/2000 | Pattison et al. |
| 6,061,432 A | 5/2000 | Wallace et al. |
| 6,078,658 A | 6/2000 | Yunoki |
| 6,088,435 A | 7/2000 | Barber et al. |
| 6,092,102 A | 7/2000 | Wagner |
| 6,100,882 A | 8/2000 | Sharman et al. |
| 6,122,348 A | 9/2000 | French-St. George et al. |
| 6,134,318 A | 10/2000 | O'Neil |
| 6,134,548 A | 10/2000 | Gottsman et al. |
| 6,144,671 A | 11/2000 | Perinpanathan et al. |
| 6,145,096 A | 11/2000 | Bereiter et al. |
| 6,154,646 A | 11/2000 | Tran et al. |
| 6,161,008 A | 12/2000 | Lee et al. |
| 6,163,692 A | 12/2000 | Chakrabarti et al. |
| 6,167,119 A | 12/2000 | Bartholomew et al. |
| 6,188,756 B1 | 2/2001 | Mashinsky |
| 6,189,026 B1 | 2/2001 | Birrell et al. |
| 6,192,123 B1 | 2/2001 | Grunsted et al. |
| 6,195,660 B1 | 2/2001 | Polnerow et al. |
| 6,215,863 B1 | 4/2001 | Bennett et al. |
| 6,219,413 B1 | 4/2001 | Burg |
| 6,226,374 B1 | 5/2001 | Howell et al. |
| 6,240,449 B1 | 5/2001 | Nadeau |
| 6,243,366 B1 | 6/2001 | Bradley et al. |
| 6,260,050 B1 | 7/2001 | Yost et al. |
| 6,275,575 B1 | 8/2001 | Wu |
| 6,282,522 B1 | 8/2001 | Davis et al. |
| 6,298,129 B1 | 10/2001 | Culver et al. |
| 6,301,338 B1 | 10/2001 | Makela et al. |
| 6,301,609 B1 | 10/2001 | Aravamudan et al. |
| 6,310,939 B1 | 10/2001 | Varney |
| 6,310,947 B1 | 10/2001 | Polcyn |
| 6,330,321 B2 | 12/2001 | Detampel et al. |
| 6,333,973 B1 | 12/2001 | Smith et al. |
| 6,349,299 B1 | 2/2002 | Spencer et al. |
| 6,351,279 B1 | 2/2002 | Sawyer |
| 6,363,143 B1 | 3/2002 | Fox |
| 6,371,484 B1 | 4/2002 | Yuan |
| 6,373,817 B1 | 4/2002 | Kung et al. |
| 6,373,930 B1 | 4/2002 | McConnell et al. |
| 6,385,754 B1 | 5/2002 | Mizumoto et al. |
| 6,389,113 B1 | 5/2002 | Silverman |
| 6,404,873 B1 | 6/2002 | Beyda et al. |
| 6,408,191 B1 | 6/2002 | Blanchard et al. |
| 6,408,327 B1 | 6/2002 | McClennon et al. |
| 6,411,605 B1 | 6/2002 | Vance et al. |
| 6,418,214 B1 | 7/2002 | Smythe et al. |
| 6,430,176 B1 | 8/2002 | Christie |
| 6,430,289 B1 | 8/2002 | Liffick |
| 6,434,226 B1 | 8/2002 | Takahashi |
| 6,442,245 B1 | 8/2002 | Castagna et al. |
| 6,442,251 B1 | 8/2002 | Maes et al. |
| 6,442,748 B1 | 8/2002 | Bowman-Amuah |
| 6,453,031 B2 | 9/2002 | Malik |
| 6,453,167 B1 | 9/2002 | Michaels et al. |
| 6,459,780 B1 | 10/2002 | Wurster et al. |
| 6,459,913 B2 | 10/2002 | Cloutier |
| 6,463,145 B1 | 10/2002 | O'Neal et al. |
| 6,463,464 B1 | 10/2002 | Lazaridis et al. |
| 6,466,910 B1 | 10/2002 | Desmond et al. |
| 6,470,079 B1 | 10/2002 | Benson |
| 6,473,615 B1 | 10/2002 | Theppasandra et al. |
| 6,477,374 B1 | 11/2002 | Shaffer et al. |
| 6,480,830 B1 * | 11/2002 | Ford et al. ..................... 705/9 |
| 6,480,890 B1 | 11/2002 | Lee, Jr. et al. |
| 6,507,644 B1 | 1/2003 | Henderson et al. |
| 6,519,326 B1 | 2/2003 | Milewski et al. |
| 6,522,734 B1 | 2/2003 | Allen et al. |
| 6,526,134 B1 | 2/2003 | Wallenius |
| 6,532,285 B1 | 3/2003 | Tucker et al. |
| 6,535,596 B1 | 3/2003 | Frey et al. |
| 6,539,082 B1 | 3/2003 | Lowe et al. |
| 6,542,596 B1 | 4/2003 | Hill et al. |
| 6,546,005 B1 | 4/2003 | Berkley et al. |
| 6,546,262 B1 | 4/2003 | Freadman |

(56) References Cited

U.S. PATENT DOCUMENTS

| | | |
|---|---|---|
| 6,547,830 B1 | 4/2003 | Mercer |
| 6,560,329 B1 | 5/2003 | Draginich et al. |
| 6,563,914 B2 | 5/2003 | Sammon et al. |
| 6,564,261 B1 | 5/2003 | Gudjonsson et al. |
| 6,574,324 B1 | 6/2003 | Malik |
| 6,574,470 B1 | 6/2003 | Chow et al. |
| 6,577,622 B1 | 6/2003 | Schuster et al. |
| 6,577,720 B1 | 6/2003 | Sutter |
| 6,584,122 B1 | 6/2003 | Matthews et al. |
| 6,587,890 B1 | 7/2003 | Kult et al. |
| 6,590,603 B2 | 7/2003 | Sheldon et al. |
| 6,590,969 B1 | 7/2003 | Peters et al. |
| 6,594,352 B1 | 7/2003 | Smith |
| 6,594,470 B1 | 7/2003 | Barnes et al. |
| 6,600,736 B1 | 7/2003 | Ball et al. |
| 6,609,113 B1 | 8/2003 | O'Leary et al. |
| 6,611,590 B1 | 8/2003 | Lu et al. |
| 6,614,786 B1 | 9/2003 | Byers |
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 | 1/2004 | Chiloyan et al. |
| 6,687,362 B1 | 2/2004 | Lindquist et al. |
| 6,690,672 B1 | 2/2004 | Klein |
| 6,693,897 B1 | 2/2004 | Huang |
| 6,694,351 B1 | 2/2004 | Shaffer et al. |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,718,178 B1 | 4/2004 | Sladek et al. |
| 6,724,887 B1 | 4/2004 | Eilbacher et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,747,970 B1 | 6/2004 | Lamb et al. |
| 6,748,054 B1 | 6/2004 | Gross et al. |
| 6,754,227 B1 | 6/2004 | Petersen et al. |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,772,436 B1 | 8/2004 | Doganata et al. |
| 6,775,267 B1 | 8/2004 | Kung et al. |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Cruickshank |
| 6,816,469 B1 | 11/2004 | Kung et al. |
| 6,820,055 B2 | 11/2004 | Saindon et al. |
| 6,839,417 B2 | 1/2005 | Weisman et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,870,916 B2 | 3/2005 | Henrikson et al. |
| 6,876,632 B1 | 4/2005 | Takeda |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,937,713 B1 * | 8/2005 | Kung et al. ............... 379/211.02 |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,988,132 B2 | 1/2006 | Horvitz |
| 6,996,227 B2 | 2/2006 | Albal et al. |
| 6,996,370 B2 | 2/2006 | De Loye et al. |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,050,558 B1 | 5/2006 | Pershan et al. |
| 7,065,198 B2 | 6/2006 | Brown et al. |
| 7,068,768 B2 | 6/2006 | Barnes |
| 7,069,298 B2 | 6/2006 | Zhu et al. |
| 7,076,528 B2 | 7/2006 | Premutico |
| 7,099,288 B1 | 8/2006 | Parker et al. |
| 7,102,643 B2 | 9/2006 | Moore et al. |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,136,461 B1 | 11/2006 | Swingle et al. |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,167,552 B1 | 1/2007 | Shaffer et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,353,258 B2 | 4/2008 | Washburn |
| 7,379,538 B1 | 5/2008 | Ali et al. |
| 7,418,090 B2 | 8/2008 | Reding et al. |
| 7,420,935 B2 | 9/2008 | Virolainen |
| 7,428,580 B2 | 9/2008 | Hullfish et al. |
| 7,546,337 B1 | 6/2009 | Crawford |
| 7,561,872 B1 * | 7/2009 | Koch et al. ............... 455/414.3 |
| 7,606,909 B1 | 10/2009 | Ely et al. |
| 7,616,747 B2 | 11/2009 | Wurster et al. |
| 7,912,193 B2 | 3/2011 | Chingon et al. |
| 8,166,173 B2 | 4/2012 | Low et al. |
| 8,238,380 B2 | 8/2012 | D'Angelo |
| 8,271,591 B2 | 9/2012 | Malik et al. |
| 8,467,502 B2 | 6/2013 | Sureka et al. |
| 2001/0003202 A1 | 6/2001 | Mache et al. |
| 2001/0012286 A1 | 8/2001 | Huna et al. |
| 2001/0014863 A1 * | 8/2001 | Williams, III ............... 705/1 |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |

(56) References Cited

U.S. PATENT DOCUMENTS

| | | |
|---|---|---|
| 2001/0043689 A1 | 11/2001 | Malik |
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0051919 A1 | 12/2001 | Mason |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076025 A1 | 6/2002 | Liversidge et al. |
| 2002/0076026 A1* | 6/2002 | Batten ..................... 379/210.02 |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper |
| 2002/0082028 A1 | 6/2002 | Wittenkamp |
| 2002/0082030 A1 | 6/2002 | Berndt et al. |
| 2002/0082997 A1 | 6/2002 | Kobata et al. |
| 2002/0083462 A1 | 6/2002 | Arnott |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0087469 A1 | 7/2002 | Ganesan et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra |
| 2002/0115471 A1 | 8/2002 | De Loye et al. |
| 2002/0122545 A1 | 9/2002 | Schwab et al. |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1* | 10/2002 | Hackbarth et al. ............ 709/205 |
| 2002/0147811 A1 | 10/2002 | Schwartz et al. |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2002/0187794 A1 | 12/2002 | Fostick et al. |
| 2003/0005150 A1 | 1/2003 | Thompson et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz |
| 2003/0063732 A1 | 4/2003 | McKnight et al. |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1 | 6/2003 | Petty et al. |
| 2003/0112928 A1 | 6/2003 | Brown et al. |
| 2003/0112952 A1 | 6/2003 | Brown et al. |
| 2003/0119532 A1 | 6/2003 | Hatch |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. |
| 2004/0034700 A1* | 2/2004 | Polcyn ........................ 709/223 |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053206 A1 | 3/2005 | Chingon et al. |
| 2005/0053221 A1 | 3/2005 | Reding et al. |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1 | 5/2006 | Sureka et al. |
| 2006/0128409 A1 | 6/2006 | Gress et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |
| 2007/0021111 A1 | 1/2007 | Celik |
| 2009/0060155 A1 | 3/2009 | Chingon et al. |

FOREIGN PATENT DOCUMENTS

| | | |
|---|---|---|
| EP | 0818908 A3 | 1/1998 |
| EP | 1014630 | 6/2000 |
| EP | 1017210 | 7/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 04-336742 | 11/1992 |
| JP | 05-316233 | 11/1993 |
| JP | 6-113020 | 4/1994 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |

(56) References Cited

FOREIGN PATENT DOCUMENTS

| | | |
|---|---|---|
| JP | 08-149226 | 6/1996 |
| JP | 08-181763 | 7/1996 |
| JP | 08-298546 | 11/1996 |
| JP | 08-331642 | 12/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 9-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2000-349902 | 12/2000 |
| JP | 2001-144859 | 5/2001 |
| JP | 2001-15921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-016673 | 1/2002 |
| JP | 2002-41522 | 2/2002 |
| JP | 2002-044123 | 2/2002 |
| JP | 2002-044257 | 2/2002 |
| JP | 2202-057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300306 | 10/2002 |
| JP | 2002-300920 | 10/2002 |
| WO | WO-95/12948 | 5/1995 |
| WO | WO-96/14704 | 5/1996 |
| WO | WO-97/20423 | 6/1997 |
| WO | WO-97/33421 | 9/1997 |
| WO | WO-98/02007 | 1/1998 |
| WO | WO-99/22493 | 5/1999 |
| WO | WO-99/38309 | 7/1999 |
| WO | WO-00/45557 | 8/2000 |
| WO | WO-00/60837 | 10/2000 |
| WO | WO-00/64133 | 10/2000 |
| WO | WO 01/11586 A1 | 2/2001 |
| WO | WO-01/22751 | 3/2001 |
| WO | WO-01/35621 | 5/2001 |
| WO | WO-01/52513 | 7/2001 |
| WO | WO-01/89212 | 11/2001 |
| WO | WO-02/25907 | 3/2002 |
| WO | 02/43338 | 5/2002 |

OTHER PUBLICATIONS

"FAQ Premium Home Answer" eVoice, http://content.evoice.com/wcs/sionUp/FAQ_premHA_s01.htm.
"Audio Digitizing Process," TalkBank, http://www.talkbank.org/da/audiodig.html.
"Macromedia SoundEdit 16 Support Center-Working with Other Programs, What is Shockwave Audio Streaming?" http://www.macromedia.com/support/soundedit/how/shock/whatis.html.
"How Internet Radio Works," Howstuffworks, http://computer.howstuffworks.com/internet-radio.htm/printable.
"Telecommunications and Personal Management Services Linked in Collaboration by Verizon and Microsoft," Oct. 23, 2001, http://www.m icrosoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp.
"NetMeeting101," http://www.meetingbywire.com/NetMeeting101.htm.
"NetMeeting102," http://www.meetingbywire.com/NetMeeting102.htm.
"Instructions on Application Sharing and Data Collaboration," VCON Escort and Cruiser, http://www.vide.gatech.edu/docs/share/.
"Instructions on Multipoint Application Sharing and Data Collaboration," VCON Escort and Cruiser with the RadVision MCU, http://www.vide.gatech.edu/docs/multi-share/.
"MediaTone—The 'Dial Tone' for Web Communications Services," Webex, 2003.
Business Solutions/Professional, http://www.accessline.com/business_sol/bs_professional_body.html.
"InteleScreener," 2003, http://www.intelescreener.com/howitworks.html.
"TeleZapper from Privacy Technologies," Privacy Corps—Our Review, 2002, http://www.privacycorps.com/pages/product1.htm.
"A Proposal for Internet Call Waiting Service Using SIP," A. Brusilovsky et al., Lucent Technologies, PINT Working Group, Internet Draft, Jan. 1999.
"A Model for Presence and Instant Messaging," M. Day et al., Fujitsu, Feb. 2000, Network Working Group, Request for Comments 2778.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connection, MailNGen, "Next Generation Messaging for Service Providers," Data Connection Limited, 2003-4.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.
Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm.
Data Connection, Strategic Computer Technology, "Messaging Software Products and Services," Data Connection Ltd, 1998-2000, http://web.archive.org/web/20000819063320/www.dataconnection.com/messging/messgidx.htm.
Data Connection, Strategic Software Technology, "DC-Share for UNIX," Data Connection Ltd, 1998-2000, http://web.archive.org/web/20000914200713/www.dataconnection.com/conf/DCshare.htm.
Data Connection, Strategic Software Technology, "DC-H.323," Data Connection Ltd, 1998-2000, http://web.archive.org/web/20001120050600/www.dataconnection.com/conf/h323.htm.
Data Connection, Strategic Software Technology, "DC-WebShare," Data Connection Ltd, 1998-2000, http://web.archive.org/web/20001016115016/www.dataconnection.com/conf/webshare.htm.
Data Connection, Strategic Computer Technology, "DC-Recorder," Data Connection Ltd, 1998-2000, http://web.archive.org/web/20001016055611/www.dataconnection.com/conf/recorder.htm.
Data Connection, Strategic Software Technology, "DC-MeetingServer," Data Connection Ltd, 1998-2000, http://web.archive.org/web/20000914200719/www.dataconnection.com/conf/meetingserver.htm.

(56) References Cited

OTHER PUBLICATIONS

Data Connection, Strategic Computer Technology, "DC-MeetingServer," Data Connection Ltd, 1998-2000, http://web.archive.org/web/20021201144529/www.dataconnection.com/inetapps/conferencing.htm.
Data Connection, Strategic Software Technology, "DC-VoiceNet Features," Data Connection Ltd, 1998-2000, http://web.archive.org/web/20001016102614/www.dataconnection.com/messging/vnfeat.htm.
Data Connection, Strategic Software Technology, "DC-VoiceNet," Data Connection Ltd, 1998-2000, http://web.archive.org/web/20000914200424/www.dataconnection.com/messging/vnet.htm.
Data Connection, Strategic Computer Technology, "Messaging Software Products and Services," Data Connection Ltd, 1998-2000, http://web.archive.org/web/20010305143803/www.dataconnection.com/messging/messgidx.htm.
Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.
Data Connection, "SmartDialer Functional Overview," Version v1.0, Internet Applications Group, Data Connection Ltd., Nov. 3, 2003.
Data Connection, "SIP Market Overview, An analysis of SIP technology and the state of the SIP Market," Jonathan Cumming, Data Connection Ltd., 2003-2004.
Data Connection, "Integrating Voicemail Systems, A white paper describing the integration of heterogeneous voicemail systems," Michael James, Internet Applications Group, Data Connection Ltd., 2004.
Data Connection, Strategic Computer Technology, "MailNGen: Next generation messaging for Service Providers," Data Connection Ltd, 1998-2004, http://www.dataconnection.com/messaging/.
Data Connection, Strategic Computer Technology, "MailNGen: Unified Messaging," Data Connection Ltd, 1998-2004, http://www.dataconnection.com/messaging/unified_messaging.htm.
Data Connection, Strategic Computer Technology, "MeetingServer: The award-winning web conferencing solution for Service Providers," Data Connection Ltd, 1998-2005, http://www.dataconnection.com/conferencing/.
Data Connection, Strategic Computer Technology, "MeetingServer: The web conferencing solution for Service Providers," Data Connection Ltd, 1998-2004, http://www.dataconnection.com/conferencing/meetingserver.htm.
Data Connection, Strategic Computer Technology, "MeetingServer: Web conferencing architecture," Data Connection Ltd, 1998-2004, http://www.dataconnection.com/conferencing/meetingserver_arch.htm.
"The Mobile Phone User Guide", http://www.mobileshop.org/usertech/wildfire.htm, printed Oct. 1, 2004.
http://replay,waybackmachine.org/20020207142936/http://www.clicktocall.com/main.htm, Internet archive of website "www.clicktocall.com", dated Feb. 7, 2002.
Cisco Personal Assistant 1.4, Cisco Systems, Jun. 24, 2003, http://www.cisco.com/en/US/products/sw/voicesw/ps2026/prod_presentation_list.html, printed Oct. 1, 2004.
Gaedke et al., Web Content Delivery to Heterogeneous Mobile Platforms, 1998, all pages.
Gessler et al., PDAs as mobile WWW browsers, 1995, all pages.
Muller, "Desktop Encyclopedia of the Internet," Artech House Inc., 1999, pp. v-xiv, 233-246, 539-559.
Gralla, "How the Internet Works," Ziff-Davis Press, 1999, pp. vi-xi, 2-3, 8-11, 308-324.
Kornowski, J., "Wildfire at Your Back and Call-A Voice-Activated Telephone Assistant That Minds You and Your Messages", http://www.lacba.org/lalawyer/techwildfire.html, printed Oct. 1, 2004.
Kunz at al., An Architecture for Adaptive Mobile Applications, 1999, all pages.
Lauff et al., Multimedia Client Implementation on Personal Digital Assistants, 1997, all pages.

"Calendar Scheduling Teleconference Communication Mechanism," IBM Technical Disclosure Bulletin, IBM Corp. New York, US, vol. 37, No. 3, Mar. 1, 1994, p. 561.
White, "How Computers Work," Millenium Edition, Sep. 1999, Que Corporation, pp. vi-xi, 135-184, 399-421.
Derfler at al., "How Networks Work," Bestseller Edition, 1996, Ziff-Davis Press, pp. vi-ix, 1-3, 21-70, 190-198.
"Voice-ASP, White Paper Technology & Processes," eVoice, Dec. 13, 2000.
"Voice-ASP, White Paper: Market Opportunities for Enhanced Voicemail," eVoice, Nov. 10, 2000.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Chapter 3: Overview," last updated Dec. 2, 1999, http://service.real.com/help/library/guides/g270/htmfiles/overview.htm.
"Telecommunications and Personal Management Services Linked in Collaboration by Verizon and Microsoft," Oct. 23, 2001, http://www.microsoft.com/presspass/press/2001/oct01/10-23MSVerizonPr.asp.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"Accessline Comms' Accessline Service, The One-Number Wonder," *CommWeb*, T. Kramer, Feb. 1, 2000, http://www.cconvergence.com/article/TCM20000504S0014.
"Audio Digitizing Process," TalkBank, http://www.talkbank.org/da/audiodig.html, six pages, retrieved from the internet on Oct. 15, 2003.
"Business Solutions/Professional," http://www.accessline.com/business_sol/bs_professional_body.html, two pages, retrieved from the internet on Apr. 17, 2003.
"Data Connection Conferencing DD-H.323," http://web.archive.org/web/20001120050600/www.dataconnection.com/conf/h323.htm, Data Connection Ltd, four pages, Copyright 1998.
"Data Connection Conferencing DC-MeetingServer," Data Connection Ltd., http://web.archive.org/web/20000914200719/www.dataconnection.com/conf/meetingserver.htm, seven pages, Copyright 1998.
"Data Connection Conferencing DC-Recorder," Data Connection Ltd., http://web.archive.org/web/20001016055611/www.dataconnection.com/conf/recorder.htm, four pages, Copyright 1998.
Data Connection DC-VoiceNet Features, Data Connection Ltd., http://web.archive.org/web/20001016102614/www.dataconnection.com/messging/vnfeat.htm, four pages, Copyright 1998.
"Data Connection Directory Systems," Data Connection Ltd., http://www.dataconnection.com/inetapps/directory.htm, two pages, Copyright 1998.
"Data Connection Messaging Software Products and Services," Data Connection Ltd, http://web.archive.org/web/20000819063320/www.dataconnection.com/messging/messgidx.htm, four pages, Copyright 1998.
"Data Connection Messaging Systems—DC-IMS\Voice for Service Providers," Data Connection Ltd, http://web.archive.org/web/20010307174512/www.dataconnection.com/messging/spivoice.htm, two pages, Copyright 1998.
"Data Connection: Web Conferencing Solutions for Service Providers," Data Connection Ltd., http://web.archive.org/web/20021201144529/www.dataconnection.com/inetapps/conferencing.htm, four pages, Copyright 1998.
"DC-SurroundSuite for Service Providers," Data Connection Ltd., http://web.archive.org/web/20000914200355/www.dataconnection.com/messging/spssuite.htm, four pages Copyright 1998.
"DC-WebShare," Data Connection Ltd., http://web.archive.org/web/20001016115016/www.dataconnection.com/conf/webshare.htm, four pages, Copyright 1998.
"Directories Explained," Data Connection Ltd., http://www.dataconnection.com/inetapps/direxpl.htm, seven pages, Copyright 1998.
"eVoice FAQ—Premium Home Answer," http://content.evoice.com/wcs/signUp/FAQ_premHA_s01.htm, three pages, retrieved from the Internet on Jul. 2, 2001.

(56) References Cited

OTHER PUBLICATIONS

"How Internet Radio Works," Howstuffworks, http://computer.howstuffworks.com/internet-radio.htm/printable, five pages, retrieved from the internet on Oct. 16, 2003.

"Instructions on Application Sharing and Data Collaboration," VCON Escort and Cruiser, http://www.vide.gatech.edu/docs/share/, 10 pages, retrieved from the internet on Oct. 6, 2003.

Instructions on Multipoint Application Sharing and Data Collaboration, VCON Escort and Cruiser with the RadVision MCU, http://www.vide.gatech.edu/docs/multi-share, six pages, retrieved from the Internet on Oct. 6, 2003.

"InteleScreener," http://www.intelescreener.com/howitworks.html, three pages, Copyright 2003.

"Macromedia SoundEdit 16 Support Center-Working with Other Programs, What is Shockwave Audio Streaming?" http://www.macromedia.com/support/soundedit/how/shock/whatis,html, two pages, retrieved from the internet on Oct. 24, 2003.

"MailNGen: Next Generation Messaging for Service Providers," Data Connection Ltd, http://www.dataconnection.com/messaging/, two pages, Copyright 2003-2004.

"MaiiNGen: Unified Messaging," Data Connection Ltd., http://www.dataconnection.com/messaging/unified_messaging.htm, two pages, Copyright 1998.

"MeetingServer: Broadband for Learning Case Study," Data Connection Ltd, http://www.dataconnection.com/conferencing/meetingserver_casestudy.htm, three pages, Retrieved from the internet on Jul. 20, 2004.

"MeetingServer: The Award-winning Web Conferencing Solution for Service Providers," Data Connection Ltd., http://www.dataconnection.com/conferencing/, two pages, Copyright 1988.

"MeetingServer: The Web Conferencing Solution for Service Providers," Data Connection Ltd., http://www.dataconnection.com/conferencing/meetingserver.htm, two pages, Copyright 1998.

"MeetingServer: Web Conferencing Architecture," Data Connection Ltd, http/www.dataconnection.com/conferencing/meetingserver_arch.htm, two pages, Copyright 1998.

"MP3 Recorder Download—MP3 Recorder—Record Audio Stream to MP3 or WAV," http://www.mp3-recorder.net, three pages, Copyright 2002.

"NetMeeting101," Meeting by Wire, http/www.meetingbywire.com/NetMeeting101.htm, nine pages, retrieved from the internet on Oct. 6, 2003.

"NetMeeting102," Meeting by Wire, http://www.meetingbywire.com/NetMeeting102,htm, 11 pages, retrieved from the Internet on Oct. 6, 2003.

"TeleZapper from Privacy Technologies," Privacy Corps—Our Review, http://www.privacycorps.com/pages/product1.htm, eight pages, Copyright 2002.

"Data Connection DC-Share for UNIX," Data Connection Ltd., http://web.archive.org/web/20000914200713/www.dataconnection.com/conf/DCshare.htm, three pages, Copyright 1998.

"DC-SurroundSuite for Enterprises," Data Connection Ltd., http://web.archive.org/web/20010306082711/www.dataconnection.com/messging/enssuite.htm, four pages, Copyright 1998.

"DC-VoiceNet," Data Connection Ltd., http://web.archive.org/web/20000914200424/www.dataconnection.com/messging/vnet.htm, four pages, Copyright 1998.

"SmartDialer Functional Overview, Version v1.0," Internet Applications Group, Data Connection Ltd., 18 pages, Nov. 3, 2003.

Cumming, "SIP Market Overview, An analysis of SIP Technology and the State of the SIP Market," Data Connection Ltd., 54 pages, Sep. 2003.

Day, et al., "A Model for Presence and Instant Messaging, RFC 2778,"Network Working Group, 12 pages, Feb. 2000.

James, "Integrating Voicemail Systems, A White Paper Describing the Integration of Heterogeneous Voicemail Systems," Internet Applications Group, Data Connection Ltd., 17 pages, Copyright 2004.

Odenwald, "Real-Time Collaboration Integration in the Portal," SAP Design Guild, http://www.sapdesignguild.org/editions/edition5/synch_collab.asp, 10 pages, retrieved from the internet on Oct. 6, 2003.

"MediaTone—The 'Dial Tone' for Web Communications Services," Webex, nine pages, Copyright 2003.

Chou, "Inside SSL: The Secure Sockets Layer Protocol," IT Professional, vol. 4, Issue 4, pp. 47-52, Jul./Aug. 2002.

Wagner, at al., "Analysis of the SSL 3.0 Protocol," Proceedings of the 2nd Conference on Proceedings of the Second USENIX Workshop on Electronic Commerce (WOEC'96 ) vol. 2, 12 pages, Nov. 1996.

* cited by examiner

| 322 | APPOINTMENTS 324 | FORWARDING PATTERN 326 |
|---|---|---|
| 8:00 | | AT HOME |
| 12:00 | Client Meeting | TRAVEL |
| 5:00 | | AT WORK |
| 9:00 | | AT HOME |

| Device 502 | Address 504 |
|---|---|
| Home 2 | 512 891 0932 |
| Cell Phone | 512 091 0932 |

| Pattern Name 508 | Start Date 510 | Start Time 512 | End Date 514 | End Time 516 | Source 518 | Destination 520 | Forwarding 522 |
|---|---|---|---|---|---|---|---|
| AT HOME | | 12:00 AM | | 8:00 AM | All | Home | Cell |
| TRAVEL | | 8:00 AM | | 12:00 PM | All | All | Cell |
| AT WORK | | 12:00 AM | | 5:00 PM | All | All | Office |
| AT HOME | | 5:00 PM | | 9:00 PM | All | Home | Cell |
| | | | | | | | |

METHOD AND APPARATUS FOR CALENDARED COMMUNICATIONS FLOW CONTROL

RELATED APPLICATIONS

Applicants claim the right to priority under 35 U.S.C, §119(e) based on Provisional Patent Application No. 60/272,122, entitled "VOICE MAIL INTEGRATION WITH INSTANT MESSENGER," filed Feb. 27, 2001; Provisional Patent Application No. 60/272,167, entitled "DEVICE INDEPENDENT CALLER ID," filed Feb. 27, 2001; Provisional Patent Application No. 60/275,667, entitled "CALENDAR CALLING AGENT," filed Mar. 13, 2001; Provisional Patent Application No. 60/275,719, entitled "CALENDAR CALLING AGENT," filed Mar. 13, 2001 now abandoned; Provisional Patent Application No. 60/275,020, entitled "METHOD AND APPARATUS FOR INTEGRATED BILLING VIA PDA," filed Mar. 13, 2001; Provisional Patent Application No. 60/275,031, entitled "METHOD AND APPARATUS FOR UNIFIED COMMUNICATIONS MANAGER VIA INSTANT MESSAGING," filed Mar. 13, 2001; and Provisional Patent Application No. 60/276,505, entitled "METHOD AND APPARATUS FOR CONTEXT BASED QUERYING," filed Mar. 19, 2001, and all of which are expressly incorporated herein by reference in their entirety.

The present application also relates to U.S. Patent Application No. 10/083,792, entitled "VOICE MAIL INTEGRATION WITH INSTANT MESSENGER"; U.S. Patent Application No. 10/083,884, entitled "DEVICE INDEPENDENT CALLER ID"; U.S. patent application No. 10/083,822, entitled "METHOD AND APPARATUS FOR A UNIFIED COMMUNICATION MANAGEMENT VIA INSTANT MESSAGING"; U.S. patent application No. 10/084,390, entitled "METHOD AND APPARATUS FOR CONTEXT BASED QUERYING"; U.S. patent application No. 10/084,121, entitled "CALENDAR-BASED CALLING AGENTS"; U.S. patent application No. 10/083,798, entitled "METHOD AND APPARATUS FOR INTEGRATED BILLING VIA PDA"; and U.S. patent application No. 10/084,002, entitled "METHOD AND APPARATUS FOR DIAL STREAM ANALYSIS", and all of which are expressly incorporated herein by reference in their entirety.

FIELD OF THE INVENTION

The present invention relates to systems and methods for controlling telephony systems using data processing systems and, more particularly, to controlling call forwarding features within a telecommunications system based on information stored in an electronic calendar system.

BACKGROUND OF THE INVENTION

A person or user ("user") may conduct communications in a variety of ways. For example, the user may conduct telephone calls via a home phone, work phone, and/or mobile phone. As the user changes location, the most appropriate way to reach that user may vary. For example, the user may be reached only at a mobile phone while on travel, or only at an office phone while at work. Typically, the user must individually configure multiple sets of call forwarding rules for each of his phones separately.

Unfortunately, maintaining multiple sets of call forwarding rules is difficult and prone to error. For example, although conventional systems allow a user to specify and associate multiple telephone devices with a particular number, the user must configure sets of rules to specify an order in which to try each number, such as a home number, and then a mobile phone number. However, the user may change locations frequently over a period of time and, thus, the user must frequently modify their call forwarding rules. This may cause one or more sets of call forwarding rules to become obsolete. In addition, the user may forget to update one or more sets of their call forwarding rules. The user may be unaware that telephone calls are being forwarded to an inappropriate location. Accordingly, the user may not receive one or more of their telephone calls.

Therefore, it would be desirable to provide methods and apparatus which overcome these and other shortcomings of the prior art.

SUMMARY OF THE INVENTION

In accordance with an aspect of the present invention, methods and apparatus for configuring communications in a voice network via a data network are provided. At least one pattern for forwarding communications in the voice network is received in a calendar via the data network. A time period for the at least one pattern is determined based on the calendar. The voice network is then configured based on the at least one pattern and the time period.

In accordance with another aspect of the present invention, methods and apparatus for providing an interface for specifying at least one pattern for forwarding communications in a voice network are provided. A calendar including a plurality of time periods is provided. In the calendar, information identifying a pattern for forwarding communications in the voice network is received. At least one of the plurality of time periods that the pattern is in effect is then determined.

In accordance with another aspect of the present invention, methods and apparatus for forwarding communications in a voice network are provided. Information indicating a pattern for forwarding communications in a time period of a calendar is received via a data network. A communications request to a destination in the pattern is received. The communications request is then forwarded to at least one other destination in the pattern based on the time period in the calendar.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

FIGS. 3a-3f are exemplary screen shots of a user interface for forwarding communications, in accordance with methods and apparatus consistent with the principles of the present invention;

FIGS. 5a-5b are exemplary tables used for forwarding communications, in accordance with methods and apparatus consistent with the principles of the present invention;

DETAILED DESCRIPTION

Methods and apparatus for forwarding communications, such as telephone calls over a voice network, are provided. A user accesses a data network to specify one or more rules for forwarding telephone calls. For example, the user may use an electronic calendar to specify patterns for forwarding their telephone calls. These patterns may include one or more rules for determining a forwarding pattern, and one or more time periods specifying when the pattern is effective. The rules are provided to a service center which provides configuration information to the voice network. The voice network then forwards calls based on the configuration information for the time periods specified by the user.

Reference will now be made in detail to exemplary embodiments of the present invention, examples of which are illustrated in the accompanying drawings. Wherever possible, the same reference numbers will be used throughout the drawings to refer to the same or like parts.

Figure 1:
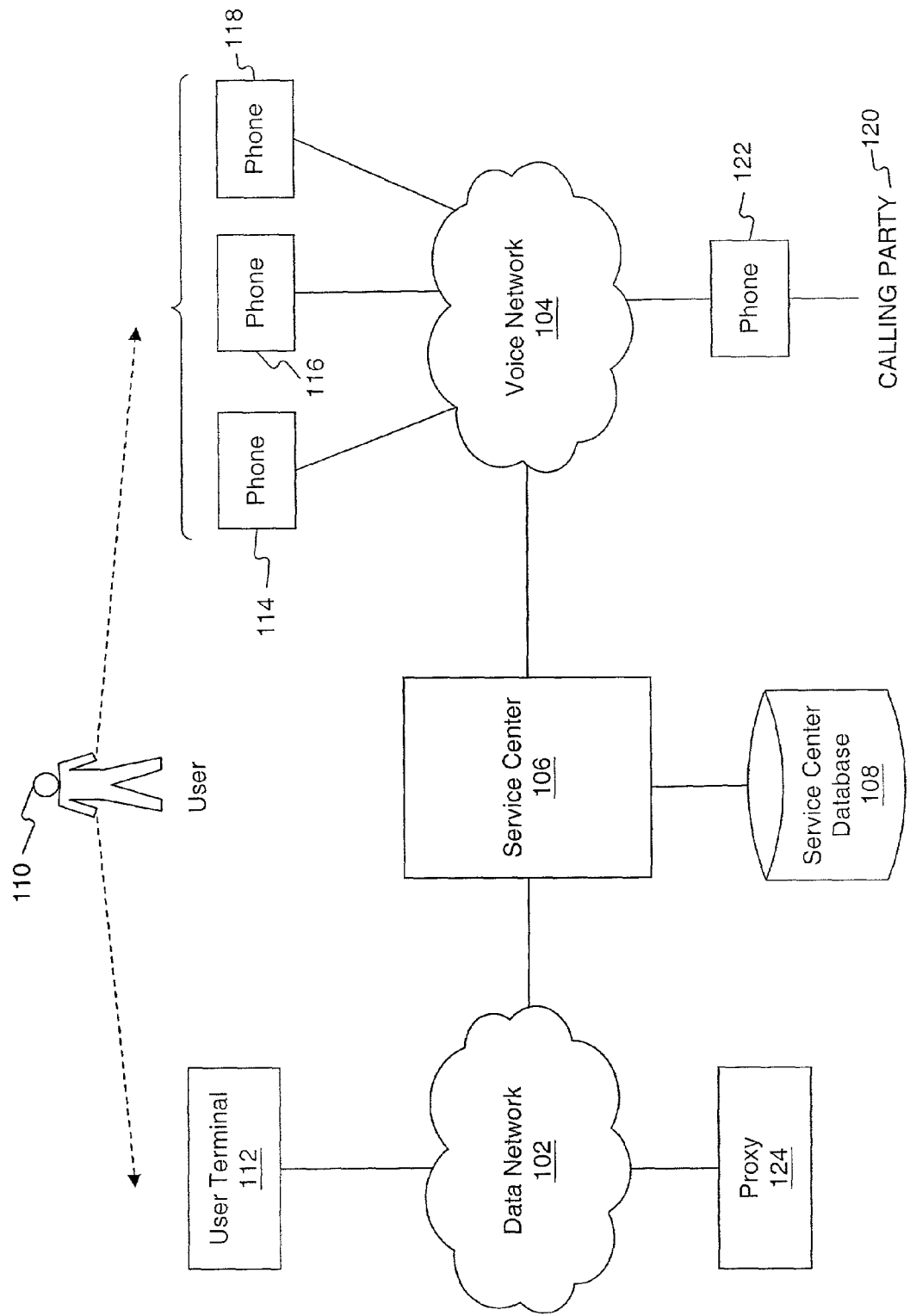
FIG. 1 is a block diagram of a data processing and telecommunications environment, in accordance with methods and apparatus consistent with the principles of the present invention.

FIG. 1 is a block diagram of a data processing and telecommunications environment, in accordance with methods and apparatus consistent with the principles of the present invention. The data processing and telecommunications environment 100 may include a data network 102, a voice network 104, a service center 106, and a service center database 108. As shown, a user 110 may use a data terminal 112 to interface with data network 102. In addition, user 110 may use phones 114, 116, and 118 to interface with voice network 104. For example, calling party 120 may use phone 122 to call user 110 at any one of phones 114, 116, and 118.

Data network 102 provides communications between the various entities depicted in environment 100 of FIG. 1, such as data terminal 112 and service center 106. Data network 102 may be a shared, public, or private network and encompass a wide area or local area. For example, data network 102 may be implemented on a network, such as the Internet.

Voice network 104 provides telephony services, for example, to allow calling party 120 to place a telephone call to user 110. For example, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both the PSTN and VoIP technology consistent with the principles of the present invention. Voice network 104 is described in further detail with reference to FIG. 6.

Service center 106 provides a platform for managing communications over data network 102 and voice network 104. In addition, service center 106 provides gateway functions, such as code and protocol conversions, to transfer communications between data network 102 and voice network 104. Service center 106 may be implemented using a combination of hardware and software. For example, service center 106 may be implemented using a plurality of a general purpose computers or servers coupled by a network (not shown). Although service center 106 is shown with direct connections to data network 102 and voice network 104, any number and type of network elements may be interposed between service center 106, data network 102, and voice network 104. Service center 106 is described in further detail with reference to FIG. 4.

Service center database 108 contains information regarding user 110. For example, service center database 108 may contain information including, an identifier for user 110, a password, one or more email addresses for user 110, one or more instant messaging identifiers for user 110, and one or more telephone numbers, such as for phones 114, 116, and 118. Additionally, service center database 108 may contain configuration information that indicate rules for how and when communications are forwarded, such as telephone calls over voice network 104. Service center database 108 may be implemented as an Oracle™ database using a combination of known hardware and software, such as Proliant™ servers and EMC storage devices.

Data terminal 112 provides user 110 an interface to data network 102. For example, data terminal 112 may be implemented using any device capable of accessing the Internet, such as a general purpose computer or personal computer equipped with a modem. Data terminal 112 may also be implemented in other devices, such as the Blackberry™, and Ergo Audrey™. Furthermore, data terminal 112 may be implemented in wireless devices, such as pagers, mobile phones (with data access functions), and Personal Digital Assistants ("PDA") with network connections.

Data terminal 112 also allows user 110 to communicate with service center 106. For example, user 110 may use instant messaging ("IM") to communicate with service center 106. IM is a communications service implemented over the Transmission Control Protocol and Internet Protocol ("TCP/IP") suite to create a private communication channel. Although there is no accepted universal IM standard, an appropriate IM model may be found in RFC 2778, M. Day et al., The Internet Society (2000), titled "A Model for Presence and Instant Messaging," which describes, inter alia, a model for providing instant messaging services. There are several known IM systems including America OnLine Instant Messenger ("AIM") and Microsoft Network Messenger Service ("MSNMS"). In addition to IM services, data terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Data terminal 112 may communicate directly with service center 106. For example, a client application may be installed on data terminal 112, which directly communicates with service center 106. Alternatively, data terminal 112 may communicate with service center 106 via proxy 124. Data terminal 112 is described in further detail with reference to FIG. 2.

Proxy 124 provides an intermediate communications service for data terminal 112 and service center 106. Proxy 124 may act on behalf of user 110 to interface service center 106 and provides functions, such as authentication services, and protocol translation services. For example, user 110 may be a MSNMS subscriber and proxy 124 may be a MSNMS server. User 110 may then use MSNMS IM services to indirectly interface service center 106. As another example, proxy 124 may be a web site. User 110 may provide information, such as information for call forwarding patterns, to proxy 124 via web pages and secured using secured sockets layer ("SSL").

Proxy 124 may then establish an SSL session with service 106 and provide the information from user 110.

Phones 114, 116, 118, and 122 interface voice network 104. Phones 114, 116, 118, and 122 may be implemented using known devices, including wireline phones and mobile phones, such as wireless phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
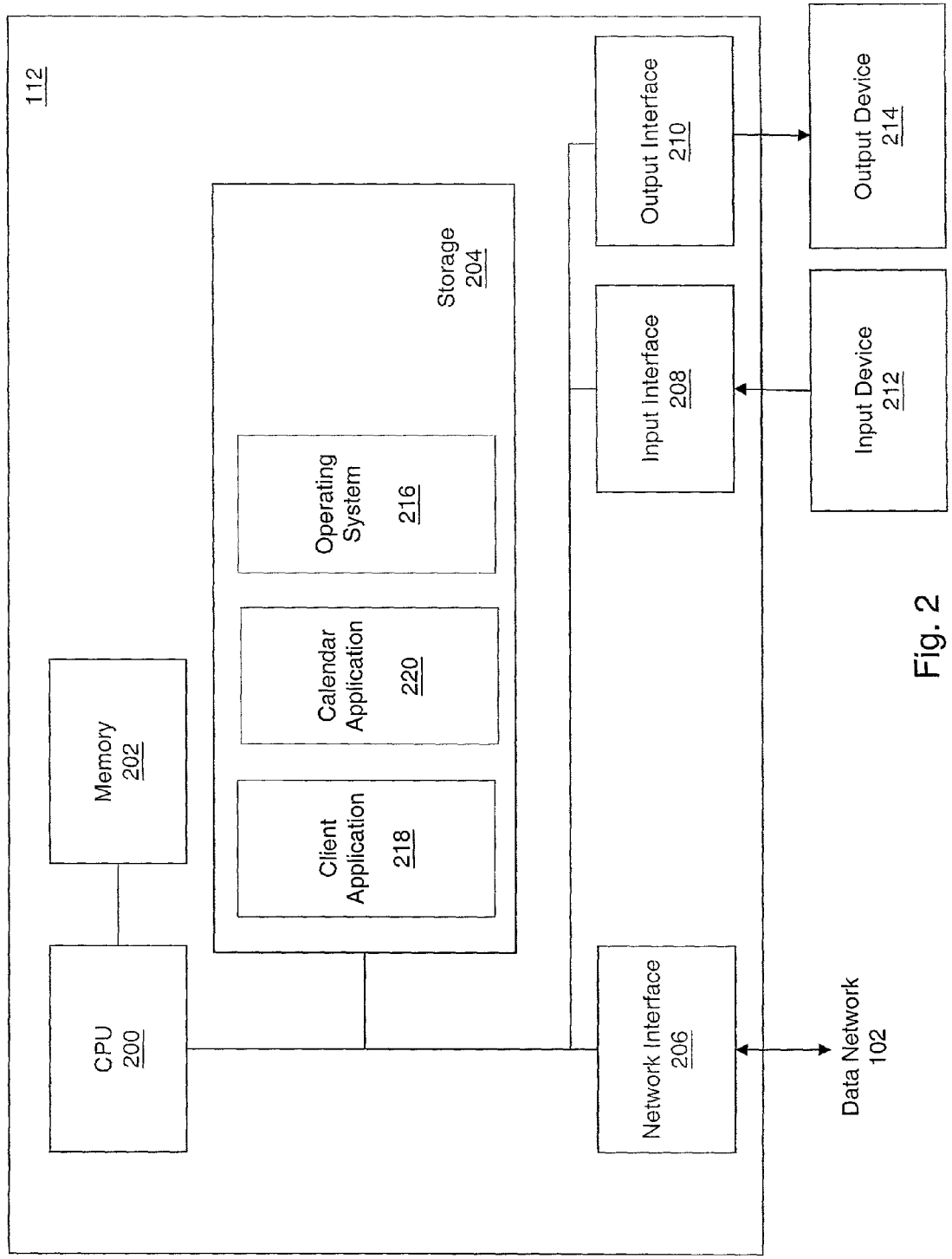
FIG. 2 is a block diagram of a data terminal, in accordance with methods and apparatus consistent with the principles of the present invention.

FIG. 2 is a block diagram of a data terminal, in accordance with methods and apparatus consistent with the principles of the present invention. As shown, data terminal 112 includes a central processing unit (CPU) 200, a memory 202, a storage module 204, a network interface 206, an input interface 208, an output interface 210, an input device 216, and an output device 218.

CPU 200 provides control and processing functions for data terminal 112. Although FIG. 2 illustrates a single CPU, data terminal 112 may include multiple CPUs. CPU 200 may also include, for example, one or more of the following: a co-processor, memory, registers, and other processing devices and systems as appropriate. For example, CPU 200 may be implemented using a Pentium™ processor provided from Intel Corporation.

Memory 202 provides a primary memory for CPU 200, such as for program code. Memory 202 may be embodied with a variety of components of subsystems, including, a random access memory ("RAM"), and a read-only memory ("ROM"). For example, when data terminal 112 executes an application installed in storage module 204, CPU 200 may download at least a portion of the program code from storage module 204 into memory 308. As CPU 200 executes the program code, CPU 200 may also retrieve additional portions of program code from storage module 204.

Storage module 204 provides mass storage for data terminal 112. Storage module 204 may be implemented with a variety of components or subsystems including, for example, a hard drive, an optical drive, a general-purpose storage device, a removable storage device, and/or other devices capable of storing information. Further, although storage module 204 is shown within data terminal 112, storage module 204 may be implemented external to data terminal 112.

Storage module 204 includes program code and information for data terminal 112 to communicate with service center 106. Storage module 204 includes program code for a calendar application 216, such as GroupWise provided by Novell Corporation, or Outlook provided by Microsoft Corporation; a client application 214, such as a MSNMS client, or AIM client; and an Operating System (OS) 216, such as the Windows Operation System provided by Microsoft Corporation. In addition, storage module 204 may include other program code and information (not shown), such as program code for TCP/IP communications; kernel and device drivers; configuration information, such as a Dynamic Host Configuration Protocol (DHCP) configuration; a web browser, such as Internet Explorer provided by Microsoft Corporation, or Netscape Navigator provided by Netscape Corporation; and any other software that may be installed on data terminal 112.

Network interface 206 provides a communications interface between data terminal 112 and data network 102. Network interface 206 may receive and transmit communications for data terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3A:
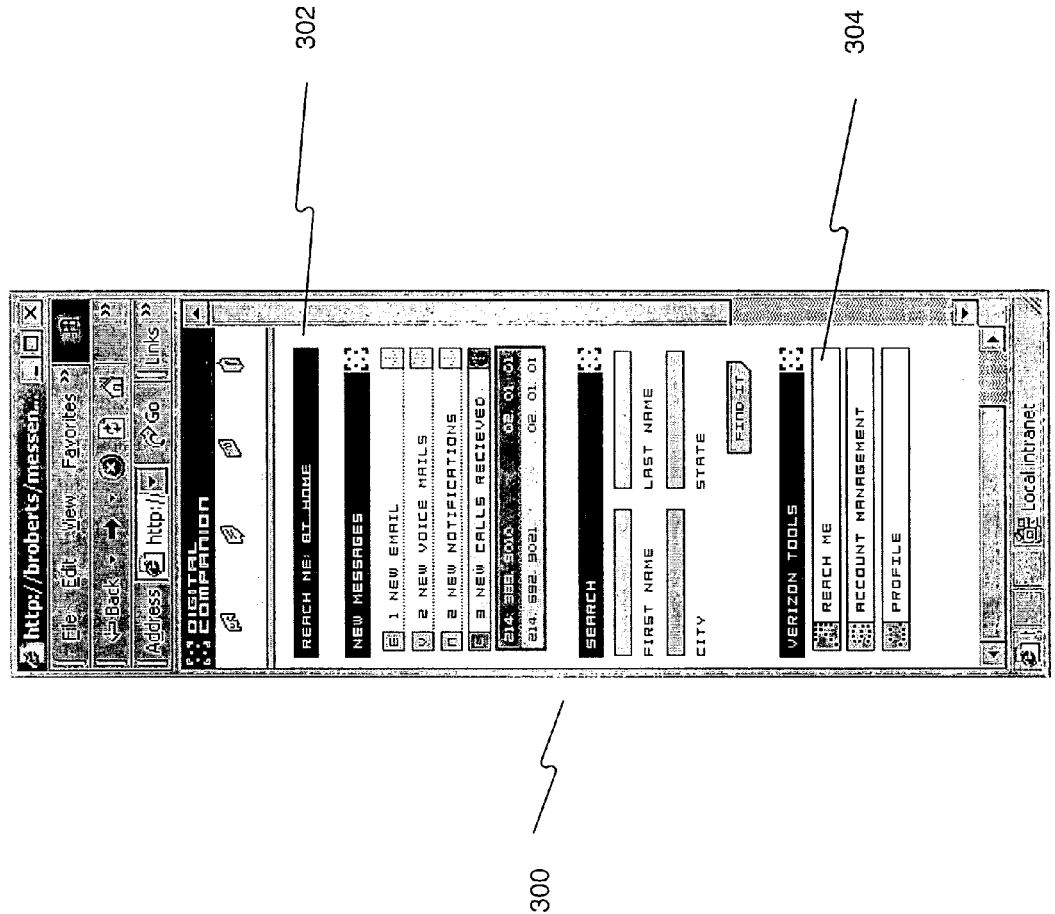

FIGS. 3a-3f are exemplary screen shots of a user interface for forwarding communications, in accordance with methods and apparatus consistent with the principles of the present invention. As shown in FIG. 3a, a screen shot 300 at portion 302 indicates that a call forwarding pattern named "AT_HOME" is currently in effect. In addition, at button 304, user 110 may select a "REACH ME" tool to select various options for specifying call forwarding patterns.

Figure 3B:
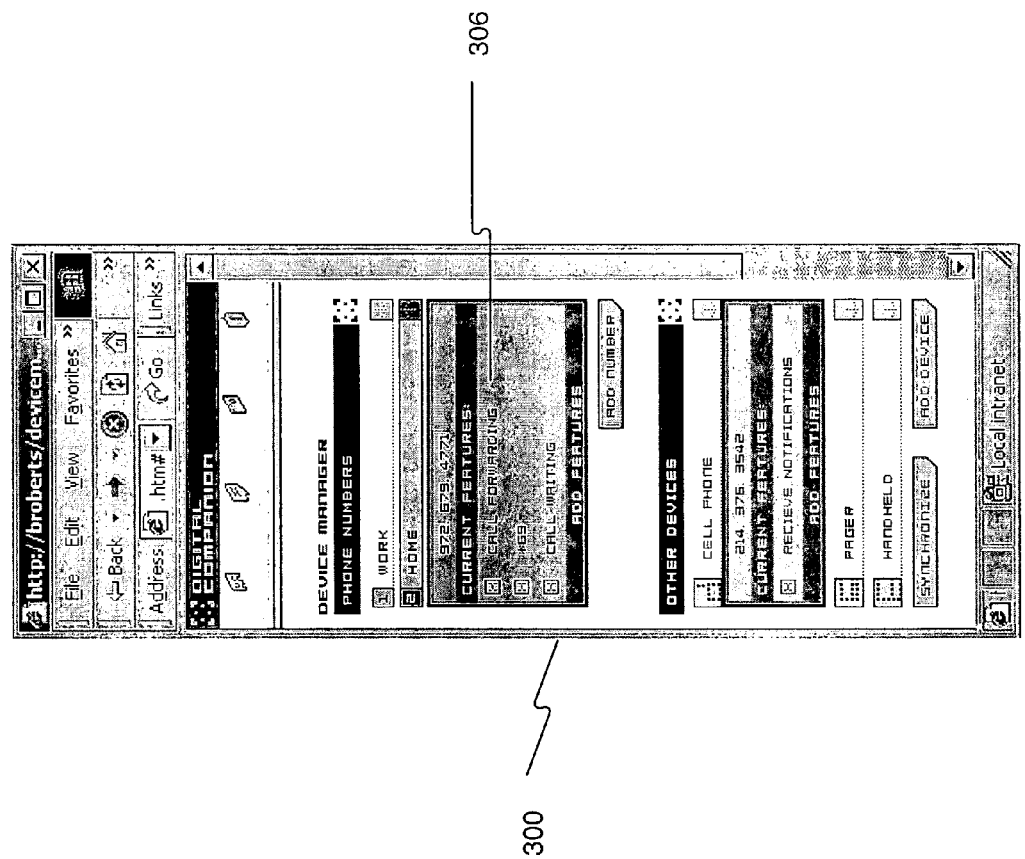

As shown in FIG. 3b, a screen shot 300 shows that user 110 may activate a call forwarding pattern at option 306. For example, user 110 has a "HOME" phone number of "972 679 4771" and has activated call forwarding.

Figure 3C:
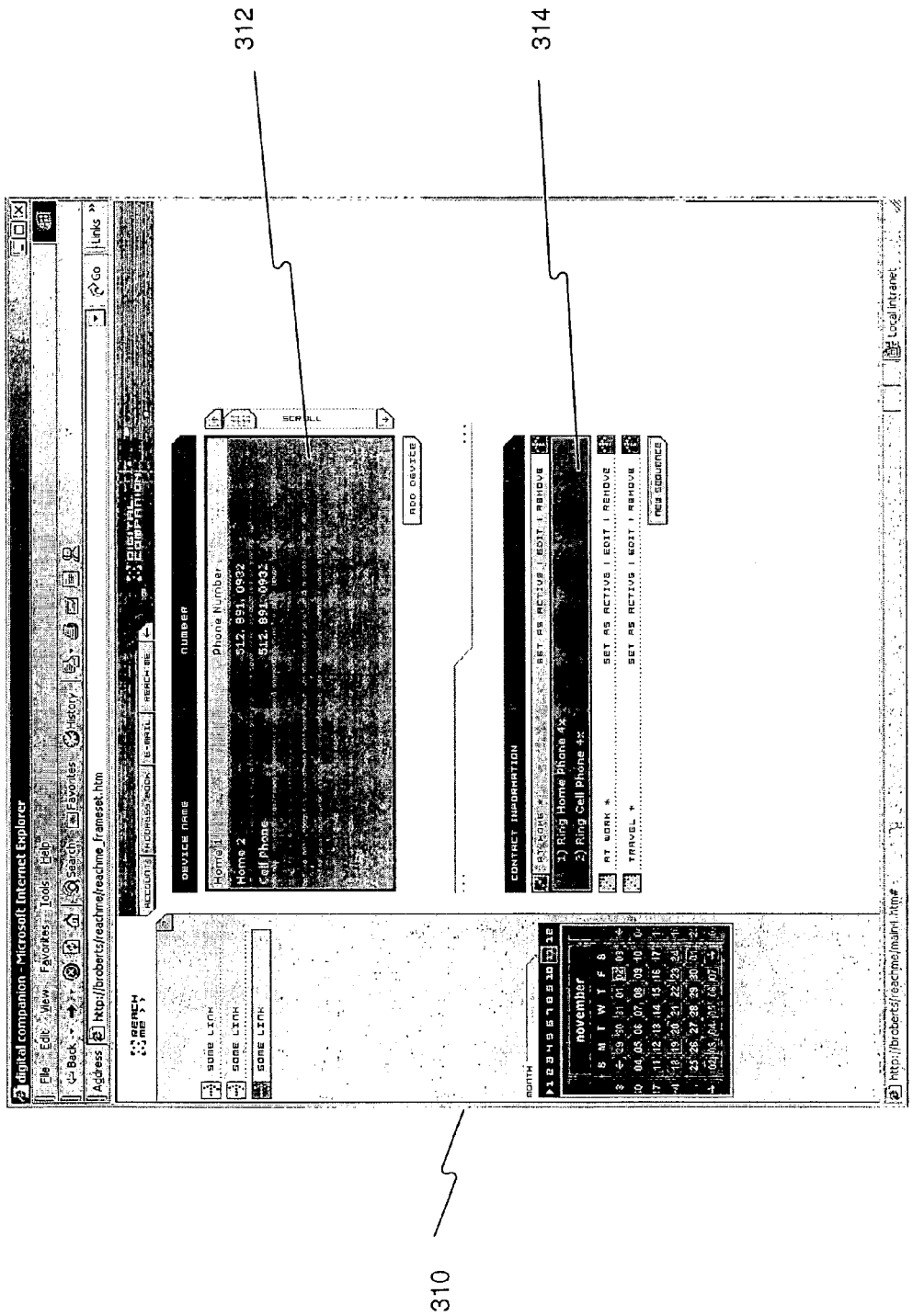

As shown in FIG. 3c, a screen shot 310 shows that user 110 may display a summary window 312 listing a name and number for his phones. Screen shot 310 also includes a summary window 314 to list a summary of call forwarding patterns created for user 110. For example, summary window 314 indicates that user 110 has call forwarding patterns named "AT HOME", "AT WORK", and "TRAVEL." Furthermore, the "AT HOME" call forwarding pattern specifies that the home phone be allowed to ring four times and then a call is forwarded to a cell phone and allowed to ring four times again.

Figure 3D:
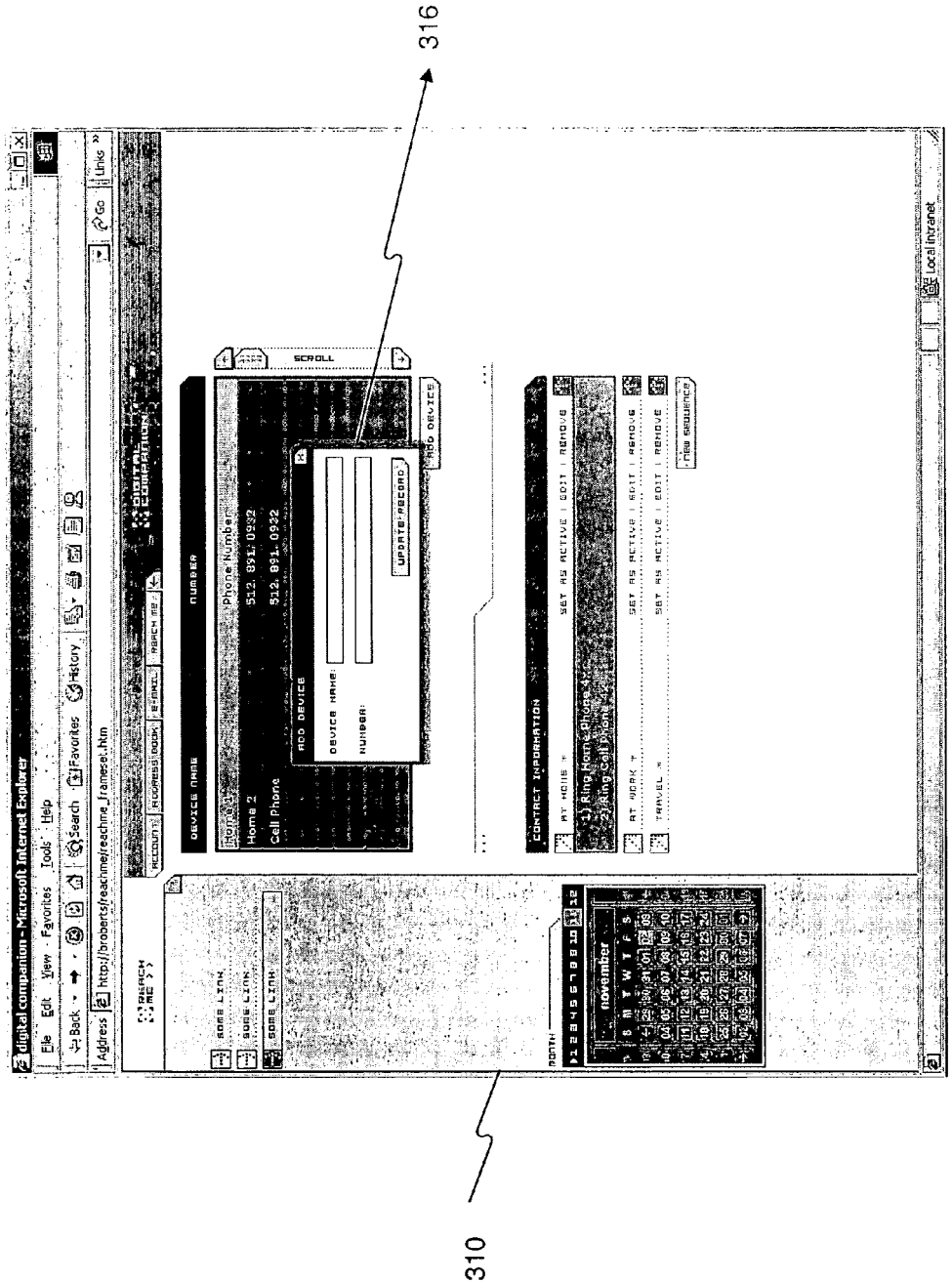

FIG. 3d shows screen shot 310 with a pop-up window 316. Pop-window 316 allows user 110 to add a new device, such as a new phone.

Figure 3E:
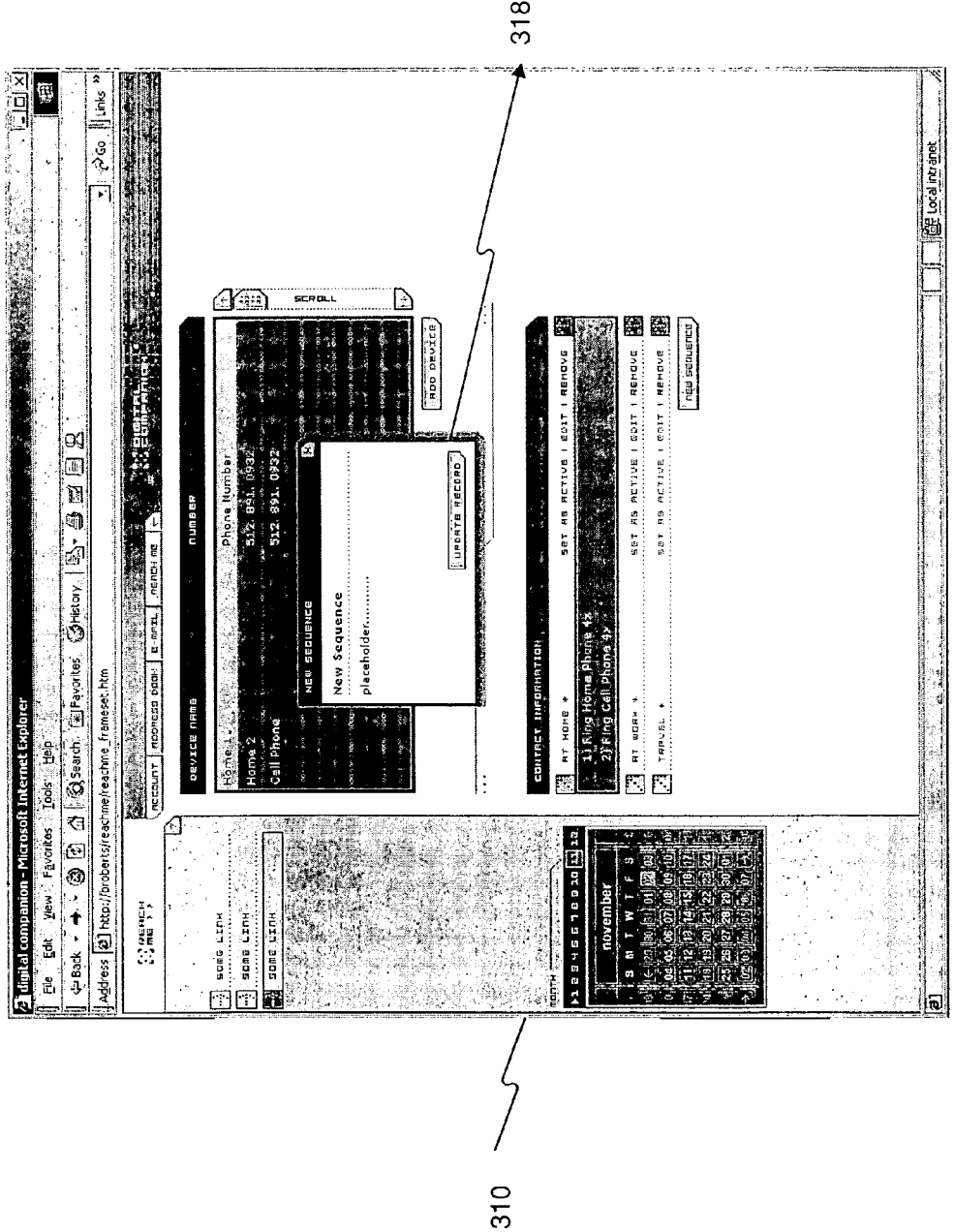

FIG. 3e shows screen shot 310 with a pop-up window 318. Pop-up window 318 allows user 110 to add a new call forwarding pattern.

FIG. 3f shows a screen shot of a calendar interface 320 associating call forwarding patterns and time periods. For example, calendar interface 320 includes a time section 322, an appointments section 324, and a forwarding pattern section 326. As shown in FIG. 3f, user 110 has specified the "AT HOME" pattern for the time period before 8:00 AM. In addition, since user 110 has a client meeting indicated in appointments section 324, user 110 has specified the "TRAVEL" pattern for the time period from 8:00 AM to 12:00 PM. Furthermore, user 110 has specified the "AT WORK" pattern for 12:00 PM to 5:00 PM, and the "AT HOME" pattern for 5:00 PM to 9:00 PM.

Figure 4:
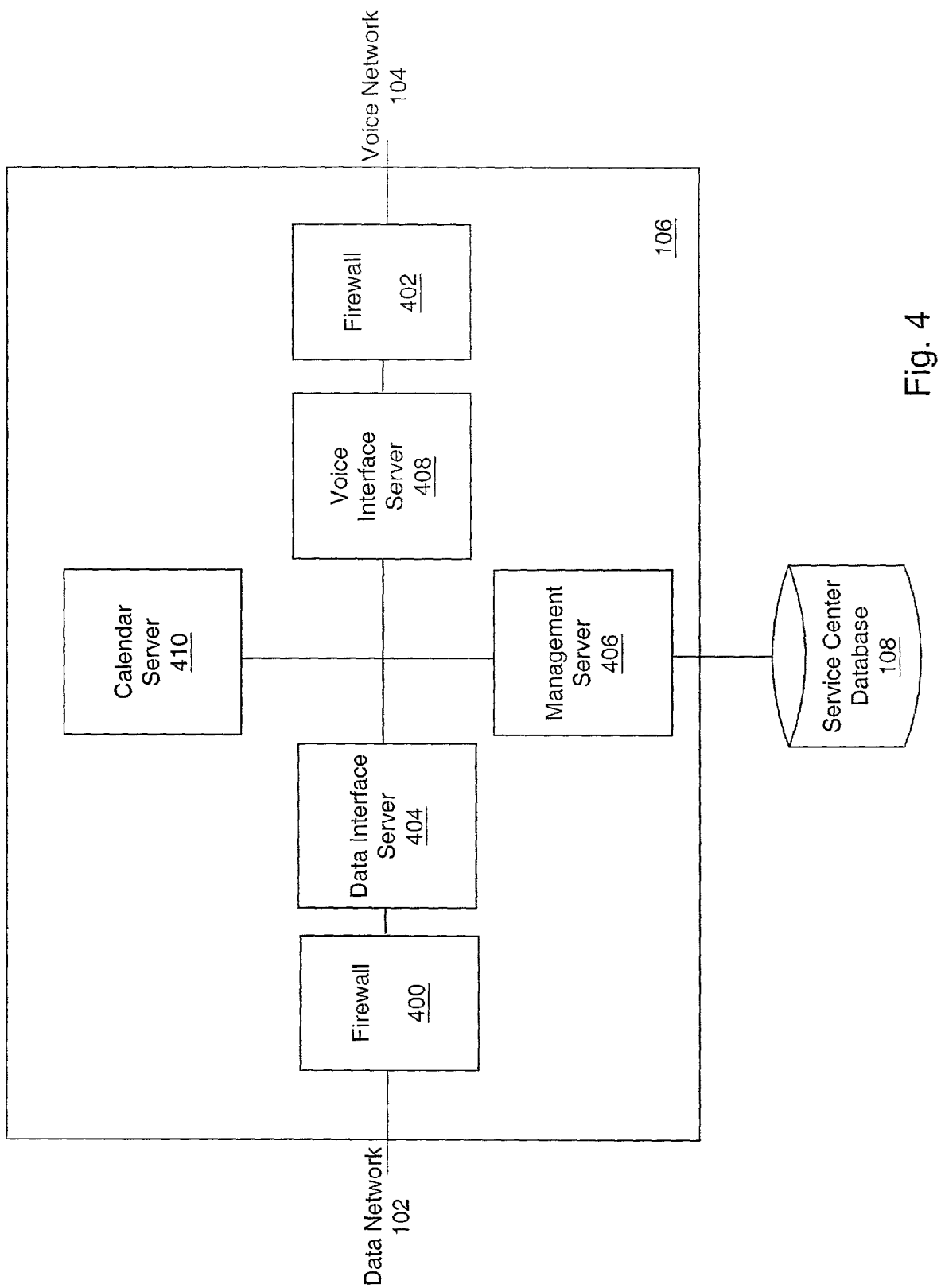
FIG. 4 is a block diagram of a service center, in accordance with methods and apparatus consistent with the principles of the present invention.

FIG. 4 is a block diagram of a service center, in accordance with methods and apparatus consistent with the principles of the present invention. As shown, service center 106 includes firewalls 400 and 402, a data interface server 404, a management server 406, a voice interface server 408, and a calendar server 410.

Firewalls 400 and 402 provide security services for communications between service center 106 and data network 102, and between service center 106 and voice network 104, respectively. For example, firewalls 400 and 402 may restrict communications between data terminal 112 and one or more servers within service center 106. Any security policy may be implemented in firewalls 400 and 402 consistent with the principles of the present invention. Firewalls 400 and 402 may be implemented using a combination of known hardware and software, such as the Raptor Firewall provided by the Axent Corporation. Furthermore, firewalls 400 and 402 may be implemented as separate machines within service center 106, or implemented on one or more machines external to service center 106.

Data interface server 404 provides interface services between service center 106 and data terminal 112. For example, data interface server 404 may exchange TCP/IP communications, such as IM communications or XML information which include call forwarding patterns from user 110. Data interface server 404 may also interface proxy 124 to indirectly exchange communications with data terminal 112.

Management server 406 controls operation of service center 106 and provides access services to service center database 108. For example, management server 406 may store information, such as call forwarding patterns, received from data interface server 404 into service center database 108. Management server 406 may also service queries to service center database 108, for example, from data interface server 404 or voice interface server 408.

Voice interface server 408 provides interface services between service center 106 and voice network 104. For example, voice interface server 408 may exchange information, such as call forwarding patterns, between service center database 108 and voice network 104. Voice interface server 408 may provide the information to voice network 104 using one or more protocols. For example, voice interface server 408 may use TCP/IP, or the Signaling System 7 ("SS7") protocol.

SS7 is a telecommunications protocol defined by the International Telecommunication Union ("ITU"). SS7 is an "out-of-band" signaling protocol using a system of nodes called Service Switching Points ("SSP"), Signal Transfer Points ("STP"), and Service Control Points ("SCP"). "Out-of-band signaling" is signaling that does not take place over the same path between switching elements as the connection, and instead uses separate digital channels between SS7 nodes. SS7 allows voice network 104 to provide enhanced functions, such as call forwarding; caller-ID; three-way calling; wireless services such as roaming and mobile subscriber authentication; local number portability; and toll-free/toll services.

Calendar server 410 provides services to calendar application 220 on data terminal 112. For example, calendar server 41 0 may provide email services, directory services, and calendar information, such as schedule information, to data terminal 112. Calendar server 410 may operate in conjunction with data interface server 404 to exchange, for example, call forwarding patterns with data terminal 112.

Although FIG. 4 shows separate servers within service center 106, service center 106 may be implemented using any combination of hardware and software. For example, service center 106 may implement data interface server 404, management server 406, voice interface server 408, and calendar server 410 as software applications installed on a single machine. In addition, service center 106 may access one or more servers remotely across a network.

FIG. 5a is an exemplary table illustrating configuration information for a user, in accordance with methods and apparatus consistent with the principles of the present invention. As shown, a table 500 includes a device name column 502 and an address column 504. Table 500 is stored at data terminal 112, such as in storage module 204, and service center database 108.

Device name column 502 includes information for identifying a particular device, such as phones 114, 116, and 118. User 110 may select any combination of text and numerals to identify a particular device. For example, user 110 may identify phone 114 as "Home," phone 116 as "Office,", and phone 118 as "Mobile." In addition, device name column 502 may include information selected by service center 106. For example, management server 406 may provide a proposed "default" name for a particular device.

FIG. 5b is an exemplary table illustrating rules and associated calendar data for forwarding communications, in accordance with methods and apparatus consistent with the principles of the present invention. As shown, a table 506 includes a pattern name column 508, a start date column 510, a start time column 512, an end data column 514, an end time column 516, a source identifier column 518, a destination identifier column 520, and a forwarding destination column 522. Table 506 is stored at data terminal 112, such as in storage module 204, and in service center database 108.

Pattern name column 508 includes information for identifying a particular forwarding pattern. User 110 may select any combination of text or numerals to identify a particular forwarding pattern. For example, user 110 may use "At Work" to identify a particular forwarding pattern for use during working hours, such as 9:00 AM to 5:00 PM. In addition, pattern name column 508 may include information selected by service center 106. For example, management server 406 may provide a default name for a particular forwarding pattern, such as "placeholder."

Start date column 510 and start time column 512 includes information indicating a start date and time for when a particular forwarding pattern is in effect. End date column 514 and end time column 516 includes information indicating an end date and time for when the particular forwarding pattern expires.

Source identifier column 518 includes information identifying a source of a communication, such as a telephone call. For example, source identifier column 518 may include the phone number for phone 122. Alternatively, source identifier column 518 may include information identifying calling party 120.

Destination identifier column 520 includes information identifying a destination of a communication, such as a telephone call. For example, destination identifier column 520 may include respective phone numbers for phones 114, 116, and 118.

Forwarding destination column 522 includes information identifying where a communication, such as a telephone call, is forwarded. For example, forwarding destination column 522 may indicate the phone number for phone 118 as a forwarding destination.

Figure 6:
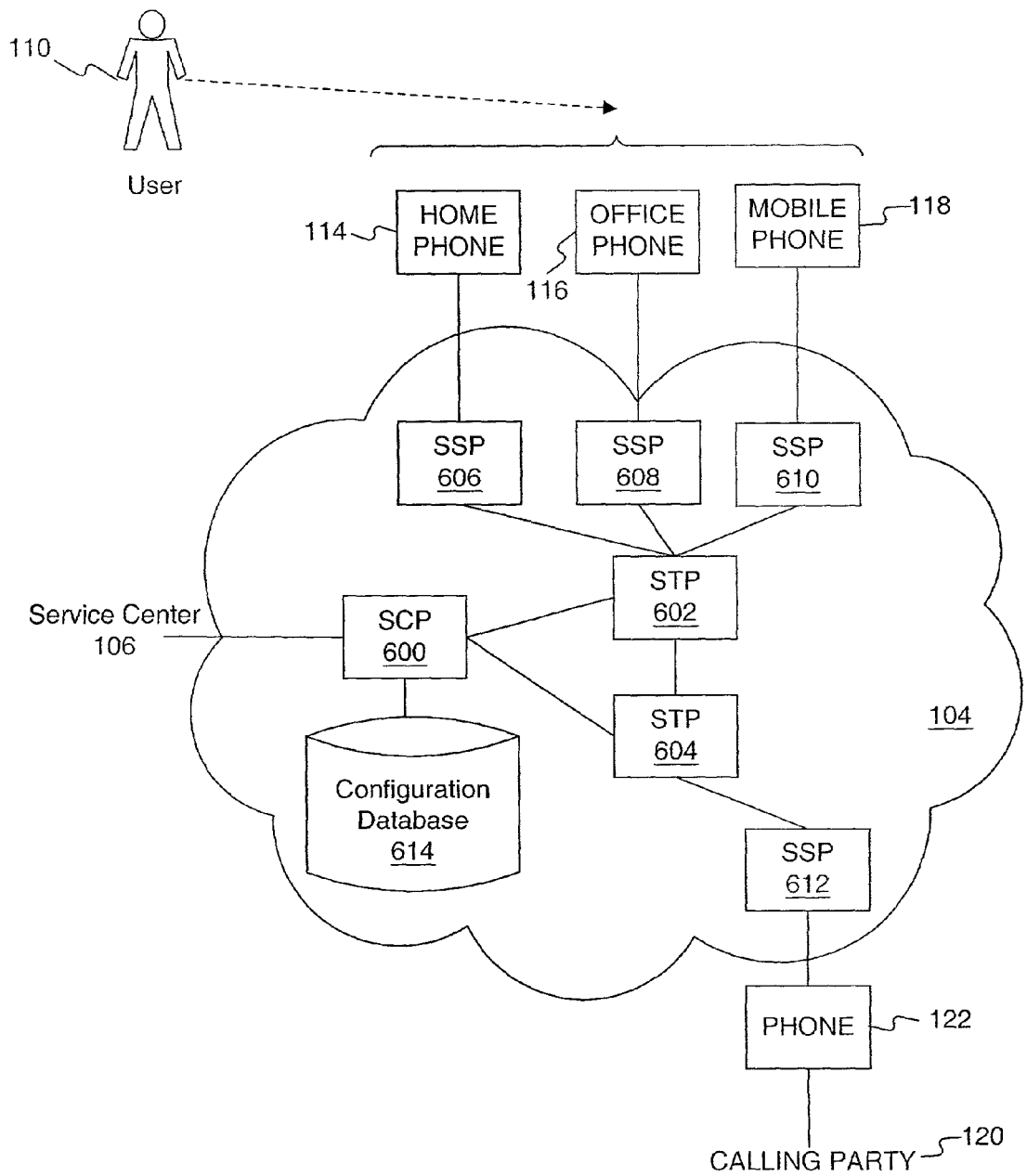
FIG. 6 is a block diagram of a voice network, in accordance with methods and apparatus consistent with the principles of the present invention.

FIG. 6 is a block diagram of a voice network, in accordance with methods and apparatus consistent with the principles of the present invention. As shown, voice network 104 includes a service control point ("SCP") 600, service transfer points ("STP") 602 and 604, service switching points ("SSP") 606, 608, 610, and 612, and a configuration database 614.

Voice network 104 may be implemented using the PSTN and SS7 as a signaling protocol. As noted above, the SS7 protocols allows voice network 104 to provide features, such as call forwarding; caller-ID; three-way calling; wireless services such as roaming and mobile subscriber authentication; local number portability; and toll-free/toll services. The SS7 protocol provides various types of messages to support the features of voice network 104. For example, these SS7 messages may include Transaction Capabilities Applications Part ("TCAP") messages to support event "triggers," and queries and responses between SCP 600 and SSPs 606, 608, 610, and 612.

SCP 600 provides interface services into configuration database 614 related to processing of calls within voice network 104, and interface services between voice interface server 408. SCP 600 provides translation and routing services of SS7 messages to support the features of voice network 104, such as call forwarding. In addition, SCP 600 may exchange information voice interface server 408 in service center 106 using TCP/IP or SS7. For example, SCP 600 may receive configuration information from voice interface terminal 408 which requests one or more call forwarding patterns in voice network 104. SCP 600 may then configure the call forwarding patterns in voice network 104 using one or more SS7 messages, such as TCAP messages, to set triggers in SSPs 606, 608, 610, and 612.

SCP 600 may be implemented using a combination of known hardware and software. Although SCP 600 is shown with a direct connection to service center 106, any number of network elements including routers, switches, hubs, etc. may be used to connect SCP 600 and service center 106.

STPs 602 and 604 relay SS7 messages within voice network 104. For example, STP 602 may route SS7 messages between SSPs 606, 608, 610, and 612. STP 602 and 604 may be integrated as adjunct to an SSP, e.g., SSPs 606, 608, 610, and 612, or may be implemented as a separate machine. In addition, STP 602 and 604 may provide security functions, such as security checks on incoming/outgoing SS7 messages. STP 602 may also provide other functions, such as acquisition and storage of traffic/usage statistics. STP 602 may be implemented using known hardware and software from manufacturers such as NORTEL™ and LUCENT Technologies ™.

SSPs 606, 608, 610, and 612 provide an interface between voice network 104 and phones 114, 116, 118, and 122, respectively, to setup, manage, and release telephone calls within voice network 104. SSPs 606, 608, 610, and 612 may be implemented as a voice switch, an SS7 switch, or a computer connected to a switch. SSPs 606, 608, 610, and 612 exchange SS7 signal units to support a telephone call between calling party 120 and user 110. For example, SSPs 606, 608, 610, and 612 may exchange SS7 messages, such as TCAP messages, within message signal units ("MSU") to control calls, perform database queries to configuration database 614, and provide maintenance information.

Configuration database 614 comprises one or more known databases to support the features of voice network 104. For example, configuration database 614 may include a call management service database; a line information database (LIDB); a business services database; a home location register; and a visitor location register.

Figure 7:
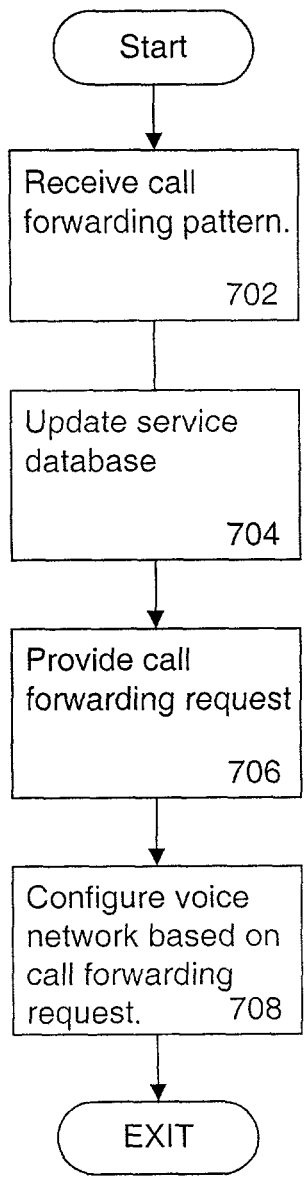
FIG. 7 is a flow diagram illustrating a process for forwarding communications, in accordance with methods and apparatus consistent with the principles of the present invention.

FIG. 7 is a flow diagram illustrating a process for providing configuration information to a voice network, in accordance with methods and apparatus consistent with the principles of the present invention. In stage 702, service center 106 receives one or more call forwarding patterns. For example, user 110 may run client application 218 and calendar application 220 on data terminal 112. User 110 may then navigate one or more screens, such as screen shots 300, 306, 310, and calendar interface 320, to specify the call forwarding patterns. Data interface terminal may store information for the call forwarding patterns using tables 500 and 506. Data terminal 112 then provides the call forwarding patterns to service center 106. For example, data terminal 112 may provide tables 500 and 506 to service center 106 (directly or via proxy 124) using TCP/IP communications, such as IM or XML.

In stage 704, service center 106 updates service center database 108. For example, data interface server 404 may receive the call forwarding patterns from data terminal 112. Data interface server 404 may then operate in conjunction with calendar server 410 to read the information in tables 500 and 506. Data interface server 404 provides the information in tables 500 and 506 to management server 406 which stores the information in service center database 108.

Based on information in table 506, such as information in start date column 510 and start time column 512 column, calendar server 410 creates an event trigger to configure the call forwarding pattern in voice network 104. Calendar server 410 may also create event triggers based on information in end date column 514 and end time column 516 to expire a call forwarding pattern and/or configure a new call forwarding pattern in voice network 104.

In stage 706, service center 106 provides one or more call forwarding requests to voice network 104. For example, upon reaching an event trigger, calendar server 410 may cause management server 406 to provide call forwarding information to voice interface server 408. The call forwarding information includes information from table 500, such as information from device column 502, and address column 504, as well as information from table 506, such as source column 518, destination column 520, and forwarding column 522. Voice interface server 408 may then form a call forwarding request, such as an SS7 TCAP message, and provide the request to SCP 600 in voice network 104. For example, the call forwarding request may request that calls to phone 114, e.g., a home phone for user 110, be forwarded to phone 118, e.g., a mobile phone for user 110.

Alternatively, the call forwarding request may also include information in start date column 510, start time column 512, end date column 514, and end time column 516. SCP 600 may then determine a time period for when the call forwarding request is in effect.

In stage 708, voice network 104 is configured to forward calls based on the call forwarding request. For example, SCP 600 may receive the SS7 TCAP message from voice interface server 408. SCP 600 may query configuration database 614 to determine whether SSPs 606, 608, 610, and 612 are associated with the call forwarding request. SCP 600 may then send one or more SS7 TCAP messages to one or more of SSPs 606, 608, 610, and 612 to configure a call forwarding trigger, such as an SS7 termination attempt trigger ("TAT").

For example, for the above call forwarding request, SCP 600 may configure a TAT in SSP 606. When calling party 120 uses phone 122 to call user 110 at phone 114, SSP 612 sends SS7 messages to SSP 606 to request a connection. SSP 606 determines that a TAT was configured for phone 114 and sends a query to SCP 600 to request instructions on how to process the call attempt to phone 114. SCP 600 queries configuration database 614 and determines that call attempts to phone 114 are forwarded to phone 118 via SSP 610. SCP 600 then instructs SSP 606 to forward the call attempt to SSP 610 which subsequently forwards the call attempt to phone 118.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of configuring communications in a voice network via a data network, comprising:
 providing a calendar user interface configured to display at least a portion of a calendar having a plurality of time periods, the calendar user interface including an appointments section and a call forwarding pattern section, the appointments section displaying appointment information applicable to the plurality of time periods, the forwarding pattern section displaying indications of call forwarding patterns for forwarding communications in the voice network and applicable to the plurality of time periods, each of the call forwarding patterns including a source identifier, a destination number and a forwarding destination identifier;

receiving, via the call forwarding pattern section of the calendar user interface, a selection of an identifier of a call forwarding pattern to be associated with one of the plurality of time periods of the calendar;

storing the identifier of the identified call forwarding pattern in the calendar in association with the one of the plurality of time periods of the calendar; and configuring the voice network based on the identified call forwarding pattern and the one of the plurality of time periods of the calendar.

2. The method of claim 1, further comprising:
forwarding communications in the voice network based on the identified call forwarding pattern and the one of the plurality of time periods of the calendar.

3. The method of claim 1, further comprising receiving information for inclusion in a call forwarding pattern indicating a call forwarding sequence in the voice network.

4. The method of claim 1, further comprising setting a trigger in the voice network based on the identified call forwarding pattern and the one of the plurality of time periods of the calendar.

5. The method of claim 1, the source identifier indicating a predetermined portion of callers to which the pattern is applicable, the forwarding destination identifier indicating to where the predetermined portion of callers are to be forwarded.

6. The method of claim 5, the source identifier indicating the predetermined portion of callers according to at least one of an identifier of a source communications device and information identifying a calling party associated with at least one source communications device.

7. A method comprising:
receiving, in a form of a calendar user interface, call forwarding pattern information identifying a plurality of call forwarding patterns for forwarding communications in a voice network, each of the call forwarding patterns including a source identifier, a destination identifier and a forwarding destination identifier;

storing the call forwarding pattern information in a database system;

providing a second form of the calendar user interface configured to display at least a portion of a calendar having a plurality of time periods the second form of the calendar user interface including an appointments section and a call forwarding pattern section, the appointments section displaying appointment information applicable to the plurality of time periods, the forwarding pattern section displaying indications of call forwarding patterns;

receiving, via the call forwarding pattern section of the second form of the calendar user interface, a selection of an identifier of a call forwarding pattern to be associated with one of the plurality of time periods of the calendar; and storing the identifier of the identified call forwarding pattern in the calendar in association with the one of the plurality of time periods of the calendar.

8. The method of claim 7, further comprising:
providing the identified call forwarding pattern and the one of the plurality of time periods to the voice network.

9. A method of forwarding communications in a voice network as carried out by at least one processor in communication with the voice network, the method comprising:

providing a calendar user interface configured to display at least a portion of a calendar having a plurality of time periods, the calendar user interface including an appointments section and a call forwarding pattern section, the appointments section displaying appointment information applicable to the plurality of time periods, the forwarding pattern section displaying indications of call forwarding patterns for forwarding communications applicable to the plurality of time periods of the calendar, each of the call forwarding patterns including a source identifier, a destination identifier and a forwarding destination identifier;

receiving, via the call forwarding pattern section of the calendar user interface, a selection of an identifier of a call forwarding pattern to be associated with one of the plurality of time periods of the calendar;

storing the identifier of the identified call forwarding pattern in the calendar in association with the one of the plurality of time periods of the calendar;

receiving a communications request during the one of the plurality of time periods of the calendar, associated with the source identifier and directed to the destination identifier;

forwarding the communications request to the forwarding destination identifier based on the time period, the destination identifier and the source identifier.

10. Apparatus for configuring communications in a voice network via a data network, comprising:
means for providing a calendar user interface configured to display at least a portion of a calendar having a plurality of time periods, the calendar user interface including an appointments section and a call forwarding pattern section, the appointments section displaying appointment information applicable to the plurality of time periods, the forwarding pattern section displaying indications of call forwarding patterns for forwarding communications and applicable to the plurality of time periods, each of the call forwarding patterns including a source identifier, a destination number and a forwarding destination identifier;

means for receiving, via the call forwarding pattern section of the calendar user interface, a selection of an identifier of a call forwarding pattern to be associated with one of the plurality of time periods of the calendar;

means for storing the identifier of the identified call forwarding pattern in the calendar in association with the one of the plurality of time periods of the calendar; and means for configuring the voice network based on the identified call forwarding pattern and the one of the plurality of time periods of the calendar.

11. The apparatus of claim 10, further comprising:
means for forwarding communications in the voice network based on the identified call forwarding pattern and the one of the plurality of time periods of the calendar.

12. The apparatus of claim 10, further comprising:
means for receiving information for inclusion in a call forwarding pattern indicating a call forwarding sequence in the voice network.

13. The apparatus of claim 10, further comprising:
means for setting a trigger in the voice network based on the identified call forwarding pattern and the one of the plurality of time periods of the calendar.

14. Apparatus comprising:
means for receiving, in the a calendar user interface, call forwarding pattern information identifying a call forwarding pattern for forwarding communications in a voice network, the call forwarding pattern including a source identifier, a destination identifier and a forwarding destination identifier;

means for storing the call forwarding pattern in a database system;

means for providing a calendar user interface configured to display at least a portion of a calendar having a plurality of time periods, the calendar user interface including an appointments section and a call forwarding pattern section, the appointments section displaying appointment information applicable to the plurality of time periods, the forwarding pattern section displaying indications of call forwarding patterns;

means for receiving, via the call forwarding pattern section of the calendar user interface, a selection of an identifier of a call forwarding pattern to be associated with one of the plurality of time periods of the calendar; and means for storing, in the database system, the identifier of the identified call forwarding pattern in the calendar in association with the one of the plurality of time periods of the calendar.

15. Apparatus for forwarding communications in a voice network, comprising:

means for providing a calendar user interface configured to display at least a portion of a calendar having a plurality of time periods, the calendar user interface including an appointments section and a call forwarding pattern section, the appointments section displaying appointment information applicable to the plurality of time periods, the forwarding pattern section displaying indications of call forwarding patterns for forwarding communications applicable to the plurality of time periods of the calendar, each of the call forwarding patterns including a source identifier, a destination identifier and a forwarding destination identifier;

means for receiving, via the call forwarding pattern section of the calendar user interface, a selection of an identifier of a call forwarding pattern to be associated with one of the plurality of time periods of the calendar;

means for storing the identifier of the identified call forwarding pattern in the calendar in association with the one of the plurality of time periods of the calendar;

means for receiving a communications request during the one of the plurality of time periods of the calendar, associated with the source identifier and directed to the destination identifier;

means for forwarding the communications request to the forwarding destination identifier based on the time period, the destination identifier and the source identifier.

16. A non-transitory computer readable medium comprising computer program code capable of configuring a device to perform a method of configuring communications in a voice network via a data network, the method comprising:

providing a calendar user interface configured to display at least a portion of a calendar having a plurality of time periods, the calendar user interface including an appointments section and a call forwarding pattern section, the appointments section displaying appointment information applicable to the plurality of time periods, the forwarding pattern section displaying indications of call forwarding patterns for forwarding communications in the voice network and applicable to the plurality of time periods, each of the call forwarding patterns including a source identifier, a destination number and a forwarding destination identifier;

receiving, via the call forwarding pattern section of the calendar user interface, a selection of an identifier of a call forwarding pattern to be associated with one of the plurality of time periods of the calendar;

storing the identifier of the identified call forwarding pattern in the calendar in association with the one of the plurality of time periods of the calendar; and configuring the voice network based on the identified call forwarding pattern and the one of the plurality of time periods of the calendar.

17. A non-transitory computer readable medium comprising computer program code capable of configuring a device to perform a method comprising:

receiving, in a form of a calendar user interface, call forwarding pattern information identifying a plurality of call forwarding patterns for forwarding communications in a voice network, each of the call forwarding patterns including a source identifier, a destination identifier and a forwarding destination identifier;

storing the call forwarding pattern information in a database system;

providing a second form of the calendar user interface configured to display at least a portion of a calendar having a plurality of time periods, the second form of the calendar user interface including an appointments section and a call forwarding pattern section, the appointments section displaying appointment information applicable to the plurality of time periods, the forwarding pattern section displaying indications of call forwarding patterns;

receiving, via the call forwarding pattern section of the second form of the calendar user interface, a selection of an identifier of a call forwarding pattern to be associated with one of the plurality of time periods of the calendar; and storing, in the database system, the identifier of the identified call forwarding pattern in the calendar in association with the one of the plurality of time periods of the calendar.

18. A non-transitory computer readable medium comprising computer program code capable of configuring a device to perform a method of forwarding communications in a voice network, comprising:

providing a calendar user interface configured to display at least a portion of a calendar having a plurality of time periods, the calendar user interface including an appointments section and a call forwarding pattern section, the appointments section displaying appointment information applicable to the plurality of time periods, the forwarding pattern section displaying indications of call forwarding patterns for forwarding communications applicable to the plurality of time periods of the calendar, each of the call forwarding patterns including a source identifier, a destination identifier and a forwarding destination identifier;

receiving, via the call forwarding pattern section of the calendar user interface, a selection of an identifier of a call forwarding pattern to be associated with one of the plurality of time periods of the calendar;

storing the identifier of the identified the call forwarding pattern in the calendar in association with the one of the plurality of time periods of the calendar;

receiving a communications request during the one of the plurality of time periods of the calendar, associated with the source identifier and directed to the destination identifier;

forwarding the communications request to the forwarding destination identifier based on the time period, the destination identifier and the source identifier of the communications request.

* * * * *